United States Patent
Pradeep et al.

(10) Patent No.: US 10,941,346 B2
(45) Date of Patent: Mar. 9, 2021

(54) PROCESS FOR CONVERSION OF FUEL GRADE COKE TO ANODE GRADE COKE

(71) Applicant: INDIAN OIL CORPORATION LIMITED, Mumbai (IN)

(72) Inventors: Ponoly Ramachandran Pradeep, Faridabad (IN); Prantik Mondal, Faridabad (IN); Terapalli Hari Venkata Devi Prasad, Faridabad (IN); Satyen Kumar Das, Faridabad (IN); Madhusudan Sau, Faridabad (IN); Sanjiv Kumar Mazumdar, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 16/844,820

(22) Filed: Apr. 9, 2020

(65) Prior Publication Data

US 2020/0377798 A1    Dec. 3, 2020

(30) Foreign Application Priority Data

May 27, 2019    (IN) .............................. 201921020973

(51) Int. Cl.
| | |
|---|---|
| *C10B 57/00* | (2006.01) |
| *B01J 20/08* | (2006.01) |
| *B01D 45/16* | (2006.01) |
| *B01J 20/12* | (2006.01) |
| *B01J 20/18* | (2006.01) |
| *B01J 20/28* | (2006.01) |
| *B03B 4/00* | (2006.01) |
| *C10B 47/30* | (2006.01) |
| *C10B 53/00* | (2006.01) |
| *C25C 3/12* | (2006.01) |

(52) U.S. Cl.
CPC ............ *C10B 57/005* (2013.01); *B01D 45/16* (2013.01); *B01J 20/08* (2013.01); *B01J 20/12* (2013.01); *B01J 20/18* (2013.01); *B01J 20/28004* (2013.01); *B01J 20/28019* (2013.01); *B03B 4/00* (2013.01); *C10B 47/30* (2013.01); *C10B 53/00* (2013.01); *C25C 3/125* (2013.01)

(58) Field of Classification Search
USPC ......... 201/17; 423/414, 460, 449.1; 422/150
See application file for complete search history.

(56) References Cited

U.S. PATENT DOCUMENTS

| | | | | |
|---|---|---|---|---|
| 4,334,960 A | * | 6/1982 | Brandenberger | ......... C10L 9/08 201/17 |
| 4,406,872 A | | 9/1983 | Kapner et al. | |
| 4,676,886 A | * | 6/1987 | Rahbe | ..................... C10B 55/00 208/131 |
| 6,332,975 B1 | * | 12/2001 | Abdel-Halim | ......... C10G 55/04 208/131 |
| 10,662,385 B2 | * | 5/2020 | Kumar | ................... C10G 55/04 |

(Continued)

*Primary Examiner* — Nina Bhat
(74) *Attorney, Agent, or Firm* — Maschoff Brennan

(57) ABSTRACT

A process of conversion of fuel grade coke produced through thermal cracking of heavy petroleum residue to anode grade coke. The process employs high sulfur fuel grade coke as the feedstock to produce low sulfur coke, which can be used to manufacture electrodes for use in the aluminum industry. A related system is adapted to remove metal content from coke and convert fuel grade coke to anode grade coke.

15 Claims, 3 Drawing Sheets

(56) References Cited

U.S. PATENT DOCUMENTS

| | | | | |
|---|---|---|---|---|
| 2013/0145683 A1* | 6/2013 | Freel | ...................... | B01J 8/1827 |
| | | | | 44/307 |
| 2017/0015910 A1* | 1/2017 | Bansal | .................... | C10B 57/02 |
| 2017/0029720 A1* | 2/2017 | Koseoglu | ................ | C10B 55/00 |
| 2017/0066971 A1* | 3/2017 | Koseoglu | ............... | C10G 45/02 |
| 2017/0247259 A1* | 8/2017 | Liu | ....................... | C01B 32/342 |
| 2017/0306239 A1* | 10/2017 | Koseoglu | ............... | C10G 55/04 |
| 2017/0335199 A1* | 11/2017 | Iqbal | .................... | C10B 57/045 |
| 2019/0382662 A1* | 12/2019 | Das | ........................ | C10B 57/02 |
| 2019/0390355 A1* | 12/2019 | Alamdari | .............. | C04B 35/532 |

\* cited by examiner

PROCESS FOR CONVERSION OF FUEL GRADE COKE TO ANODE GRADE COKE

FIELD OF THE INVENTION

The present invention relates to a conversion of fuel grade coke produced through thermal cracking of heavy petroleum residue to anode grade coke. More particularly, present invention related to a process, which utilizes a novel thermal treatment and adsorption method in combination, to change composition of the fuel grade coke to reduce sulfur and metal contents in the fuel grade coke. Further, the invention also relates to a system for conversion of fuel grade coke to anode grade coke.

BACKGROUND OF THE INVENTION

With deteriorating crude oil quality in terms of higher sulfur content and high metal content, the coke produced due to processing of high sulfur feedstock in Delayed Coker unit is fuel grade coke having high sulfur & metal contents. This coke fetches low price to refiners, impacting over-all profitability of the Delayed Coker Unit. With increasing concerns of pollution to environment due to use of high sulfur fuel grade coke as a fuel source in boilers etc., several new regulations regarding restriction of its use in various industries are being proposed by regulatory bodies. Several agencies and governments are also moving towards imposing a ban on use of high sulfur petcoke as fuel, which when implemented will require the refiners to look for possible value addition to high sulfur fuel grade coke. Meanwhile, it is notable that with several countries moving forward in the direction of economic development, consumption of consumer goods is an increasing trend. Aluminium and paint industries are also flourishing worldwide in this backdrop. Anode grade coke, which is employed for preparation of graphite electrodes for manufacture of aluminium, is in short supply worldwide. It is therefore beneficial to have a technology for conversion of high sulfur fuel grade coke into Anode grade coke, addressing both issues of petcoke disposal and Anode grade coke shortage.

U.S. Pat. No. 4,676,886A discloses a process for production of anode grade coke from a hydrocarbon feed characterized by high levels of sulfurs and metals. The hydrocarbon feed is hydrocracked in a hydrocracking reactor so as to produce an overhead effluent which is fed to a hot separator wherein a light hydrocarbon stream and a slurry hydrocracked product are produced. The hydrocracked product is fed to a separator and mixed with a solvent wherein the solids are separated out from the hydrocracked residual so as to produce a clean hydrocracked residual which is fed to a coking drum and coked so as to leave a mass of green anode grade coke.

U.S. Pat. No. 6,332,975B1 describes a process for making anode grade coke which comprises solvent deasphalting a residue feedstock to obtain an essentially asphaltene-free, resin-containing stream and coking the resin-containing stream in a delayed coker to make anode coke.

US20170015910A1 discloses co-production of a product anode grade coke and a product fuel grade coke is done using a system configured to implement a method that includes: directing an anode grade coker charge material from a tower to a first coke drum set; generating the product anode grade coke using the first coke drum set while directing a first vapor stream from the first coker drum set to the tower; directing a fuel grade coker charge material from a fractionator to a second coke drum set; generating the product fuel grade coke using the second coke drum set while directing a second vapor stream from the second coke drum set to the fractionator; and directing a third vapor stream from the tower to the fractionator while generating the product anode grade coke using the first coke drum set and generating the product fuel grade coke using the second coke drum set.

U.S. Pat. No. 4,406,872A describes a process for de-sulfurizing high sulfur fuel grade coke by contacting the coke with sulfur bearing gas at high temperature and an inert gas thereafter, to cause desulfurization.

While a few of the prior art inventions try to address the aspect of reducing the sulfur content of fuel grade coke, higher content of metals like 'Vanadium' in the fuel grade coke remain an issue, especially while using the desulfurized coke as Anode grade coke for preparation of electrodes. The presence of vanadium in the electrode is detrimental to the electrode quality, as it promotes oxidation of the same causing a reduction in electrode strength and integrity.

Therefore, a technology is required which can address the issue of reduction of sulfur content as well as removal of the metals especially vanadium, from the high sulfur fuel grade coke to produce low sulfur and low metal containing coke, which can be further used as anode grade coke for preparation of graphite electrodes, typically used in aluminium industry.

OBJECTIVES OF THE INVENTION

It is the primary objective of the present invention to provide a process which converts low value high sulfur fuel grade coke to produce higher value low sulfur and low metal anode grade coke.

It is the further objective of the present invention to provide a thermal treatment process, used to thermally treat high sulfur and high metal fuel grade petroleum coke produced in delayed coking process, thus converting the high sulfur and high metal fuel grade petroleum coke into low sulfur and low metal coke suitable for manufacturing graphite electrodes.

It is the further objective of the present invention to provide a process which utilizes thermal treatment and adsorption method for removal of sulfur and metals from high sulfur and high metal fuel grade coke.

SUMMARY OF THE INVENTION

Accordingly, present invention provides a process for conversion of a fuel grade coke to an anode grade coke, wherein the fuel grade coke comprises 3 to 9 wt % of sulfur, 7 to 13 wt % of a volatile matter, 85 to 91 wt % of a fixed carbon, 200 to 1500 ppm of Vanadium and the process comprising:
  (a) subjecting the fuel grade coke to thermal treatment in a rotary calciner kiln to produce a thermally treated coke, wherein the volatile matter ranges from 0 to 0.3 wt % and the sulfur ranges from 0.5 to 3 wt % in the thermally treated coke;
  (b) mixing the thermally treated coke of step (a) and a metal trapping adsorbent supplied from an adsorbent vessel in a mixing unit to effect transfer of metals from the thermally treated coke to the adsorbent thereby obtaining an adsorbent-coke mixture comprising of a demetallized coke and a metal laden adsorbent, wherein the demetallized coke is obtained by demetallizing the coke and the metal laden adsorbent is obtained by increasing metal level in the adsorbent;

(c) separating the demetallized coke and the metal laden adsorbent of the step (b) by fluidization;
(d) collecting the separated demetallized coke from step (c) to obtain the anode grade coke;
(e) collecting the separated metal laden adsorbent from step (c) and routing to the adsorbent vessel of step (b); and
(f) withdrawing a part of the separated metal laden adsorbent of step (e) from the adsorbent vessel and adding a fresh metal free adsorbent to the adsorbent vessel to reduce metal level in the adsorbent supplied to the mixing unit of step (b).

In one of the features of the present invention, the thermal treatment of the fuel grade coke in step (a) is performed at a temperature ranging from 1250 to 1500° C. In one of the preferred features the temperature is ranging from 1275° C. to 1450° C.

In another feature of the present invention, the mixing of step (b) is carried out at a temperature in the range of 680 to 800° C. for a period ranging from 1 to 30 minutes.

In yet another feature of the present invention, the mixing unit of step (b) is a rotary cooler. In still another feature of the present invention, the ratio of an adsorbent flow rate to a fuel grade coke flow rate into the rotary cooler ranges from 1:1 to 15:1. Preferably, the ratio of the adsorbent flow rate to fuel grade coke flow rate into the rotary cooler ranges from 2:1 to 10:1.

In yet another feature of the present invention, the mixing unit comprises of a fluidized mixer vessel to mix the thermally treated coke and the adsorbent; wherein the thermally treated coke is crushed to fine powder of 10 to 500 micron size prior to mixing with the adsorbent.

In still another feature of the present invention, the adsorbent is heated to a temperature in the range of 680 to 800° C. prior to mixing with the thermally treated coke.

In still another feature of the present invention, the ratio of adsorbent flow rate to fuel grade coke flow rate into the fluidized mixer vessel ranges from 0.5:1 to 15:1. Preferably the ratio of adsorbent flow rate to fuel grade coke flow rate into the fluidized mixer vessel ranges from 1:1 to 10:1.

In one of the features of the present invention, the adsorbent is a spherical particle of the size ranging from 10 to 160 microns and comprises of:
1 to 40 wt % of a rare earth oxide;
5 to 25 wt % of an alumina;
1 to 9 wt % of a zeolite; and
10 to 45 wt % of a clay,
wherein the weight % being based on the total weight of the adsorbent and the rare earth oxide is selected from the group consisting of lanthanum oxide, cerium oxide and neodymium oxide.

Present invention also provides a system for conversion of a fuel grade coke to an anode grade coke, the system comprising:
(a) a rotary kiln to
receive a feed of the fuel grade coke; and
thermally treat the fuel grade coke to produce a thermally treated coke,
(b) an adsorbent vessel connected to a separator vessel to
receive a fresh metal free adsorbent;
receive a metal laden adsorbent;
withdraw the metal laden adsorbent from the adsorbent vessel; and
supply the adsorbent to a mixing unit,
(c) a mixing unit connected to the rotary kiln and to an adsorbent vessel to
receive the thermally treated coke from the rotary kiln;
receive an adsorbent from the adsorbent vessel; and
mix the thermally treated coke and the adsorbent to obtain an adsorbent-coke mixture comprising of a demetallized coke and a metal laden adsorbent,
(d) a separator vessel in fluid communication with the mixing unit to separate the adsorbent-coke mixture into the demetallized coke for use as anode grade coke; and the metal laden adsorbent.

In one of the features of the present invention, in the system the separator vessel uses a fluidizing medium to fluidize and separate the demetallized coke and the metal laden adsorbent.

In another feature of the present invention, the mixing unit consists of a rotary cooler in fluid communication with the rotary kiln and the adsorbent vessel to cool and mix the thermally treated coke and the adsorbent to obtain the adsorbent-coke mixture.

In yet another feature of the present invention, a cyclone separator is in fluid communication with the separator vessel to recover the fine particles in gases emerging out of the separator vessel for disposal or reuse.

In still another feature of the present invention, the mixing unit consists of
(i) a rotary cooler in fluid communication with the rotary kiln to receive and cool the thermally treated coke and to obtain a cooled thermally treated coke;
(ii) a crusher section in fluid communication with the rotary cooler to receive and crush the cooled thermally treated coke to obtain a crushed thermally treated coke; and
(iii) a mixer vessel in fluid communication with the crusher section and the adsorbent vessel to mix the crushed thermally treated coke and the adsorbent to obtain the adsorbent-coke mixture.

In still another feature of the present invention, the adsorbent received is a heated adsorbent.

Present invention also provides a system for conversion of a fuel grade coke to an anode grade coke, the system comprising:
(a) a rotary kiln (4, 32) to
receive a feed of the fuel grade coke (2, 31); and
thermally treat the fuel grade coke to produce a thermally treated coke (8, 37),
(b) an adsorbent vessel (16, 56) connected to a separator vessel (12, 50) to
receive a fresh metal free adsorbent (23, 60);
receive a metal laden adsorbent (26, 55);
withdraw the metal laden adsorbent (27, 61) from the adsorbent vessel (16, 56); and
supply the adsorbent (17, 59) to a mixing unit (70),
(c) a mixing unit (70) connected to the rotary kiln and to an adsorbent vessel (16, 56) to
receive the thermally treated coke from the rotary kiln;
receive an adsorbent (17, 59) from the adsorbent vessel; and
mix the thermally treated coke and the adsorbent to obtain an adsorbent-coke mixture (11, 46) comprising of a demetallized coke and a metal laden adsorbent,
(d) a separator vessel (12, 50) in fluid communication with the mixing unit to separate the adsorbent-coke mixture into
the demetallised coke for use as anode grade coke (13, 53); and
the metal laden adsorbent (26, 55).

In one of the features of the present invention, the separator vessel uses a fluidizing medium to fluidize and separate the demetallized coke and the metal laden adsorbent.

In another feature of the present invention, the mixing unit consists of a rotary cooler (9) in fluid communication with the rotary kiln (4) and the adsorbent vessel (16) to cool and mix the thermally treated coke and the adsorbent to obtain the adsorbent-coke mixture (11).

In yet another feature of the present invention, in the system a cyclone separator (18) is in fluid communication with the separator vessel (12) to recover the fine particles in gases emerging out of the separator vessel for disposal or reuse.

In still another feature of the present invention, the mixing unit (70) consists of
(i) a rotary cooler (40) in fluid communication with the rotary kiln (32) to receive and cool the thermally treated coke and to obtain a cooled thermally treated coke (41);
(ii) a crusher section (42) in fluid communication with the rotary cooler (40) to receive and crush the cooled thermally treated coke to obtain a crushed thermally treated coke (43); and
(iii) a mixer vessel (44) in fluid communication with the crusher section and the adsorbent vessel (56) to mix the crushed thermally treated coke (43) and the adsorbent (59) to obtain the adsorbent-coke mixture (46).

In still another feature of the present invention, the adsorbent received is a heated adsorbent.

DETAILED DESCRIPTION OF THE INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Feedstock:

The solid petroleum coke to be used as feedstock in the process of the present invention is fuel grade coke produced in delayed coking unit. The sulfur content of the fuel grade coke used as a feedstock to the process is more than 3 wt % and the vanadium content is more than 200 ppm. The feed fuel grade pet-coke is crushed to typically less than 65 mm size using crushers prior to feeding into the rotary kiln.

Adsorbent:

The adsorbent employed in the present invention comprises the micron sized fluidizable adsorbent material enabling adsorption of metals especially vanadium through adsorbent-coke surface to surface contact. The adsorbent can be selected from commercially available adsorbents such as those used in fluid catalytic cracking process for adsorption of vanadium from FCC catalyst in regenerator conditions. The average particle size of the adsorbent can vary from 10 to 160 microns. The adsorbent is a spherical particle of the size ranging from 10 to 160 microns and contains a 1 to 40 wt % rare earth oxide, 5 to 25 wt % alumina, 1 to 9 wt % zeolite and 10 to 45 wt % clay wherein the rare earth oxide is selected from the group consisting of Lanthanum oxide, Cerium oxide and neodymium oxide.

In one feature of the present invention, adsorbents capable of adsorbing the organometallic compounds of other undesirable metals such as Nickel are also employed in combination with adsorbent for removal of vanadium.

Figure 1:
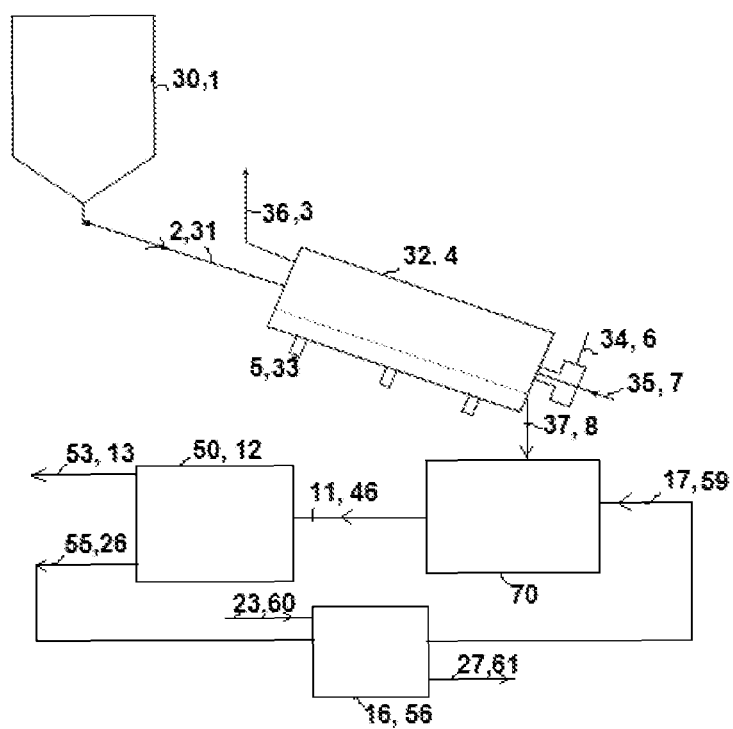
FIG. 1: Schematic diagram of process for conversion of fuel grade coke to anode grade coke in accordance with the present invention.

Process Conditions:

In accordance to FIG. 1, the crushed high sulfur fuel grade coke is fed to the rotary kiln at a desired feed rate by a belt conveyor for effective heat transfer inside the kiln. The feed-end temperature of the rotary kiln is kept in the range of 500 to 900° C., preferably between 700 to 850° C. to enable removal of moisture. The fire-hood temperature of the rotary kiln is kept in the range of 1250 to 1500° C., preferably between 1275° C. to 1450° C. to effect the burning of volatile matter and removal of sulfur as oxides. The kiln rpm is kept between 0.2 to 2.5 rpm, preferably between 0.5 to 1.7 rpm to control the residence time of coke inside the kiln and also to subject the coke to heat transfer in a homogenized manner. Residence time for the thermal treatment in the kiln may vary from 10 minutes to 4 hours, preferably from 20 minutes to 1 hour to enable completion of reactions for removal of moisture, volatile matter and sulfur. The temperature inside the coke-adsorbent contact section is kept in the range of 680 to 800° C., preferably in the range of 710 to 760° C. to enable the metals especially, vanadium to be mobile. The mobile vanadium transfers to the adsorbent particle when there is a surface to surface contact between the coke and adsorbent particles and gets adsorbed in the adsorbent particle by chemical adsorption. This is effected by certain reactive Lanthanum based compounds in the adsorbent which conjoins with vanadium to form a compound like Lanthanum Vanadate, after formation of which the metal is trapped inside the adsorbent particle and will lose its mobility to transfer back to the coke particles. The ratio of adsorbent flow rate to coke flow rate into the cooler is kept in the range of 0.5:1 to 15:1, preferably in the range of 1:1 to 10:1 to enable effective removal of metal by thorough adsorbent-coke contact. The residence time in the mixing sub-section of the coke-adsorbent contact section is kept in the range from 10 minutes to 3 hours, preferably from 15 minutes to 2 hours, when the rotary cooler is employed for the purpose and the contact time of the adsorbent and coke particles is kept in the range of 1 minute to 30 minutes, preferably between 2 to 15 minutes when a fluidized mixer vessel is employed.

Figure 2:
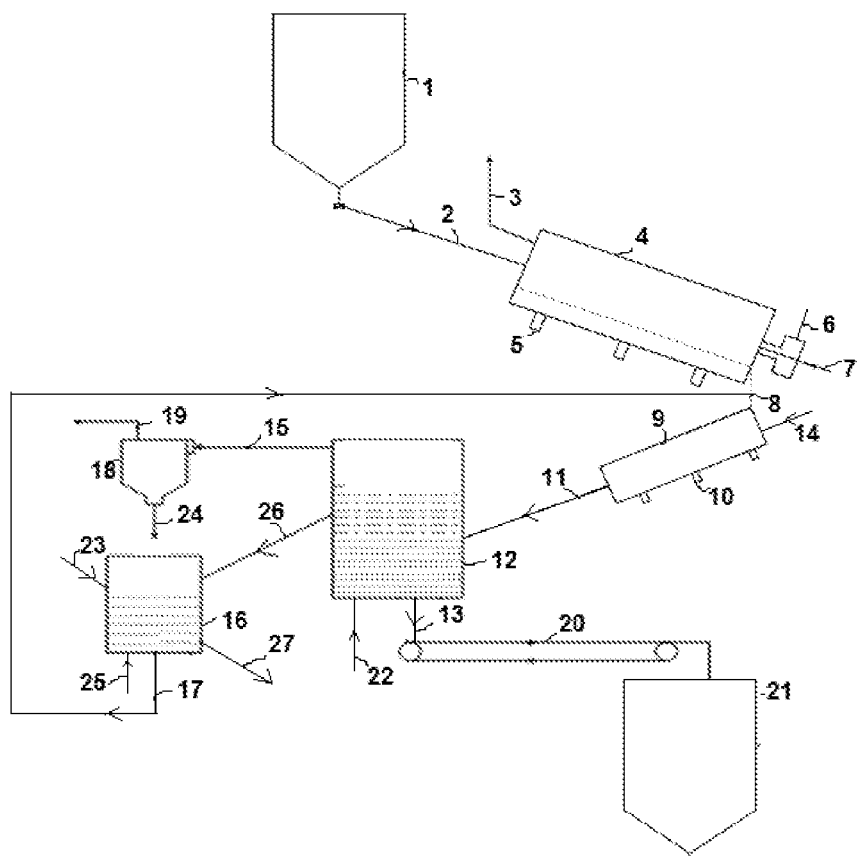
FIG. 2: Schematic diagram of process for conversion of fuel grade coke to anode grade coke in accordance with one feature of the invention.

In accordance to FIG. 2, the crushed high sulfur fuel grade coke is fed to the rotary kiln at a desired feed rate by a belt conveyor for effective heat transfer inside the kiln. The feed-end temperature of the rotary kiln is kept in the range of 500 to 900° C., preferably between 700 to 850° C. to enable removal of moisture. The fire-hood temperature of the rotary kiln is kept in the range of 1250 to 1500° C., preferably between 1275° C. to 1450° C. to effect the burning of volatile matter and removal of sulfur as oxides. The kiln rpm is kept between 0.2 to 2.5 rpm, preferably between 0.5 to 1.7 rpm to control the residence time of coke inside the kiln and also to subject the coke to heat transfer in a homogenized manner. Residence time for the thermal treatment in the kiln may vary from 10 minutes to 4 hours, preferably from 20 minutes to 1 hour to enable completion of reactions for removal of moisture, volatile matter and sulfur. The temperature inside coke cooler is kept in the range of 200 to 1000° C., preferably between 200 to 800° C. to enable mobility of metals especially vanadium and the rpm is kept in the range of 0.2 to 5 rpm, preferably in the range of 0.5 to 3 rpm to enable effective surface to surface contact between coke and adsorbent. The mobile vanadium transfers to the adsorbent particle when there is a surface to surface contact between the coke and adsorbent particles and gets adsorbed in the adsorbent particle by chemical adsorption. This is effected by certain reactive Lanthanum based compounds in the adsorbent which conjoins with vanadium to form a compound like Lanthanum Vanadate, after formation of which the metal is trapped inside the adsorbent particle and will lose its mobility to transfer back to the coke particles. The residence time in the cooler is kept in the range from 10 minutes to 3 hours, preferably from 15 minutes to 2 hours to enable metal adsorption as well as cooling of coke. The ratio of adsorbent flow rate to coke flow rate into the cooler is kept in the range of 1:1 to 15:1, preferably in the range of 2:1 to 10:1 to enable effective removal of metal by thorough adsorbent-coke contact.

Figure 3:
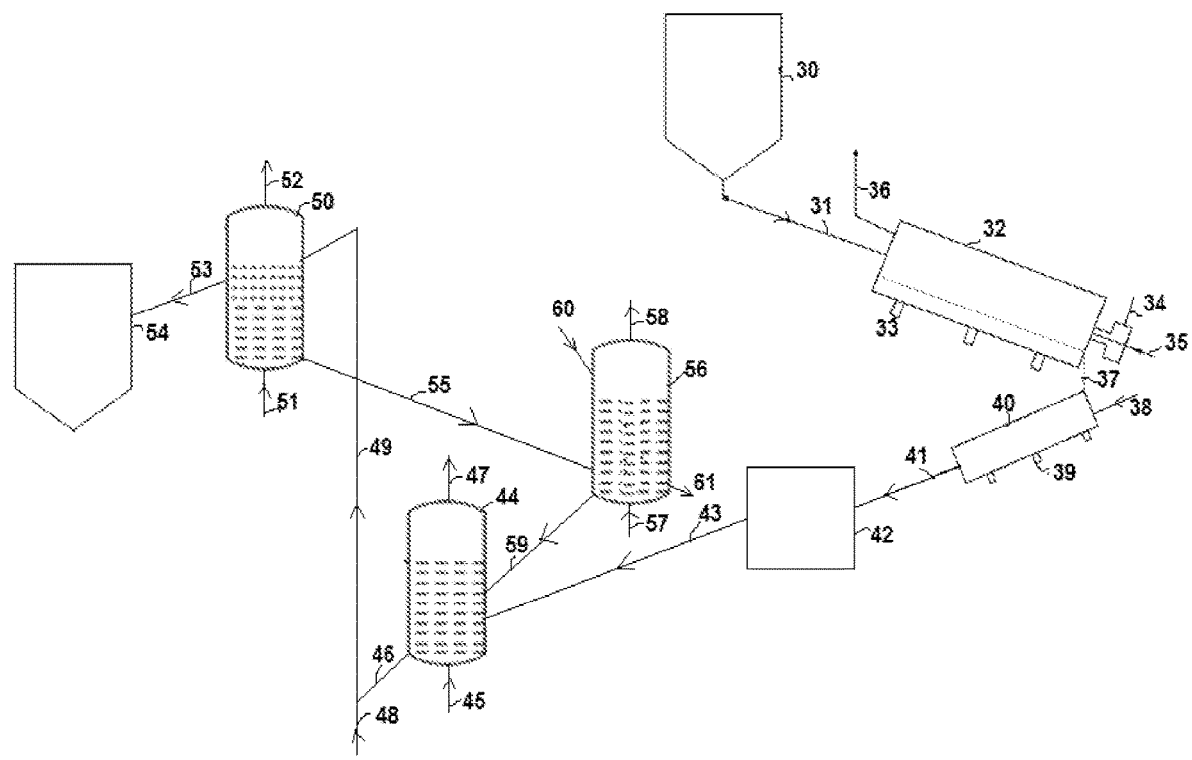
FIG. 3: Schematic diagram of process for conversion of fuel grade coke to anode grade coke in accordance with another feature of the invention.

In accordance to FIG. 3, the crushed high sulfur fuel grade coke is fed to the rotary kiln at a desired feed rate by a belt conveyor for effective heat transfer inside the kiln. The feed-end temperature of the rotary kiln is kept in the range of 500 to 900° C., preferably between 700 to 850° C. to enable removal of moisture. The fire-hood temperature of the rotary kiln is kept in the range of 1250 to 1500° C., preferably between 1275° C. to 1450° C. to effect the burning of volatile matter and removal of sulfur as oxides. The kiln rpm is kept between 0.2 to 2.5 rpm, preferably between 0.5 to 1.7 rpm to control the residence time of coke inside the kiln and also to subject the coke to heat transfer in a homogenized manner. Residence time for the thermal treatment in the kiln may vary from 10 minutes to 4 hours, preferably from 20 minutes to 1 hour to enable completion of reactions for removal of moisture, volatile matter and sulfur. The temperature inside cooler is kept in the range of 200 to 1000° C., preferably between 200 to 800° C. and the rpm is kept in the range of 0.2 to 5 rpm, preferably in the range of 0.5 to 3 rpm. The residence time in the cooler can vary from 10 minutes to 3 hours, preferably from 15 minutes to 2 hours. The cooled coke is crushed in a crusher section to fine powder to enable its fluidization and is sent to a mixer vessel. The ratio of adsorbent flow rate to coke flow rate into said mixer vessel is kept in the range of 0.5:1 to 15:1, preferably in the range of 1:1 to 10:1 to enable thorough surface to surface contact between adsorbent and coke powder. The temperature of the mixer vessel is kept in the range of 680 to 800° C., preferably in the range of 710 to 760° C. to enable the metals especially, vanadium to be mobile and the contact time of the adsorbent and coke particles is kept in the range of 1 minute to 30 minutes, preferably between 2 to 15 minutes to enable effective adsorption and transfer of metals especially vanadium from coke particles to the adsorbent. The mobile vanadium transfers to the adsorbent particle when there is a surface to surface contact between the coke and adsorbent particles and gets adsorbed in the adsorbent particle by chemical adsorption. This is effected by certain reactive Lanthanum based compounds in the adsorbent which conjoins with vanadium to form a compound like Lanthanum Vanadate, after formation of which the metal is trapped inside the adsorbent particle and will lose its mobility to transfer back to the coke particles. The temperature of the adsorbent heater vessel is calculated based on the desired hot coke temperature to be supplied to the mixer vessel to maintain the coke-adsorbent mix temperature desired in the mixer vessel. The residence time in the separator vessel is decided based on the fluidization properties of the coke and adsorbent particles to cause effective separation of the two materials.

Process Description:

The process of the present invention is exemplified by, but not limited to FIG. 1. The high sulfur fuel grade coke of desired size range is stored in the feed silo (30, 1). The coke (2, 31) is sent to the feed-end of the rotary kiln (32, 4) at a controlled flow rate by means such as a load cell and conveyer belt. The rotary kiln is rotated at a desired rpm by means of motors (5, 33). Fuel (35, 7) and air (34, 6) streams are supplied to the fire-hood end of the rotary kiln for burning and producing a flame inside the kiln (32, 4). The heat is transferred from the flame to the coke particles through radiation and convention heat transfer and a part of the coke particles burn off to release more heat. The flue gases (36, 3) exiting the kiln is sent to heat recovery and treatment section before venting to atmosphere. The volatile matter content of the feed coke which is typically in the range of 8 to 13 wt % is burned off in presence of oxygen in the air, to low levels in the range of 0 to 0.5 wt % during the calcination process inside the kiln and the sulfur compounds are thermally disintegrated to form sulfur oxides and form part of the flue gases. In addition, real density of the coke also increases due to the reduction in moisture, volatile matter contents during thermal treatment. The thermally treated hot coke (37, 8) from the rotary kiln (32, 4) is sent to a coke-adsorbent contacting section (70) which contacts the coke and an adsorbent (17, 59) supplied from an adsorbent vessel (16, 56). During the coke-adsorbent contact, the mobile metals like vanadium transfers to the adsorbent particle when there is a surface to surface contact between the coke and adsorbent particles and gets adsorbed in the adsorbent particle by chemical adsorption. This is effected by certain reactive Lanthanum based compounds in the adsorbent which conjoins with vanadium to form a compound like Lanthanum Vanadate, after formation of which the metal is trapped inside the adsorbent particle and will lose its mobility to transfer back to the coke particles. The adsorbent and coke mixture (11, 46) is routed to a separator vessel (50, 12), which separates the adsorbent particles (55, 26) and coke (53, 13). The separated adsorbent particles are sent to the adsorbent vessel (16, 56) in which a fresh supply of metal free adsorbent (23, 60) is sent to the adsorbent vessel and some amount of metal laden adsorbent (27, 61) is withdrawn from the vessel. Coke-adsorbent contacting section (70) can contain sub-sections for cooling of hot coke like rotary cooler, crushing of coke to smaller particles etc. to enable proper coke-adsorbent surface to surface contact. In an embodiment, a rotary cooler is used as Coke-adsorbent contacting section (70). In another embodiment, a coke crusher and separate fluidized vessel is used for coke-adsorbent contact in the Coke-adsorbent contacting section (70).

The process of the present invention is exemplified by FIG. 2. The high sulfur fuel grade coke of desired size range is stored in the feed silo (1). The coke (2) is sent to the feed-end of the rotary kiln (4) at a controlled flow rate by means such as a load cell and conveyer belt. The rotary kiln is rotated at a desired rpm by means of motors (5). Fuel (7) and air (6) streams are supplied to the fire-hood end of the rotary kiln for burning and producing a flame inside the kiln (4). The heat is transferred from the flame to the coke particles through radiation and convention heat transfer and a part of the coke particles burn off to release more heat. The flue gases (3) exiting the kiln is sent to heat recovery and treatment section before venting to atmosphere. The volatile matter content of the feed coke which is typically in the range of 8 to 13 wt % is burned off in presence of oxygen in the air, to low levels in the range of 0 to 0.5 wt % during the calcination process inside the kiln and the sulfur compounds are thermally disintegrated to form sulfur oxides and form part of the flue gases. In addition, real density of the coke also increases due to the reduction in moisture, volatile matter contents during thermal treatment. The thermally treated hot coke (8) from the rotary kiln (4) is sent to the rotary cooler (9) which is rotated at desired rpm by means of motors (10). Water (14) is supplied to the rotary cooler to accelerate the cooling of coke. A stream of adsorbent particles (17) is routed from the adsorbent vessel (16) and is mixed with the hot coke particles (8) routed into the rotary cooler (9). In the rotary cooler (9), the coke particles and adsorbent particles mix thoroughly and mobile metals are transferred from coke to adsorbent. The mobile vanadium transfers to the adsorbent particle when there is a surface to surface contact between the coke and adsorbent particles and gets adsorbed in the adsorbent particle by chemical adsorption. This is effected by certain reactive Lanthanum based compounds in the adsorbent which conjoins with vanadium to form a compound like Lanthanum Vanadate, after formation of which the metal is trapped inside the adsorbent particle and will lose its mobility to transfer back to the coke particles. The adsorbent and coke mixture (11) are sent to the separator vessel (12), where fluidizing medium like air (22) is supplied to assist fluidization. The demetallized coke (13) requires higher fluidization velocity compared to the adsorbent particles due to the much higher particle size of the coke compared to the adsorbent. In the separator vessel (12), the flow rate of the fluidizing medium sent to the bottom section of the vessel is so adjusted that the bigger coke particles are settled in the bottom section of the separator vessel and the fine adsorbent particles fluidize more and are floating on the top section of the separator vessel. The bigger demetallized coke particles are withdrawn from the bottom part of the separator vessel (13) and are then sent to the product silo (21) by means of a belt conveyor (20). The fine adsorbent particles (26) floating in the top section of the separator vessel are withdrawn from an outlet in the top section of the vessel into an adsorbent vessel (16). Any fine adsorbent particles entrained in the fluidizing medium and emerging out of the vessel (12) is carried over in the gases emerging from the top (15), is sent to cyclone separator (18) and is separated as fines (24) for disposal or reuse. The cleaner gas (19) exits the top of the cyclone separator (18) and is sent for heat recovery or further clean-up processes employed for flue gases. Separated adsorbent particles (26) are sent to an adsorbent vessel (16) kept in fluidized condition by means of supply of gas (25) like air. Depending upon these metal levels to be maintained in the adsorbent, a part of the metal laden adsorbent is withdrawn (27) and fresh metal free adsorbent (23) is added into the adsorbent vessel (16). In one of the features of the present invention, the metal is not removed from the adsorbent. Metal transfers from coke to the adsorbent and a part of the adsorbent is replaced with fresh adsorbent.

An embodiment of the present invention is provided in FIG. 3. In FIG. 3, the high sulfur and high metal raw coke (31) from the feed silo (30) is fed at a controlled rate by means of load cell and conveyer belt, into the feed-end side of the rotary calciner kiln (32), which is rotated by motors (33). Fuel (35) and air (34) streams are supplied to the fire-hood end of the rotary kiln for burning and producing a flame inside the kiln (32). The heat is transferred from the flame to the coke particles through radiation and convention heat transfer and a part of the coke particles burn off to release more heat. The flue gases (36) exiting the kiln is sent to heat recovery and treatment section before venting to atmosphere. The volatile matter content of the feed coke which is typically in the range of 8 to 13 wt % is burned off in presence of oxygen in the air, to low levels in the range of 0 to 0.5 wt % during the calcination process inside the kiln and the sulfur compounds are thermally disintegrated to form sulfur oxides and form part of the flue gases. In addition, real density of the coke also increases due to the reduction in moisture, volatile matter contents during thermal treatment. The thermally treated hot coke (37) is sent to the rotary cooler (40) which is rotated at desired rpm by means of motors (39). Water (38) is supplied to the rotary cooler to accelerate the cooling of coke. The cooled coke (41) is then sent to a crusher section (42) where the coke is crushed into a fine powder capable of fluidization. The powdered coke (43) is supplied to a mixer vessel (44), where the coke and hot adsorbent (59) supplied from the adsorbent heater vessel (56) is mixed together. The adsorbent heater vessel (56) is heated using hot flue gases supplied in the bottom (57) from the kiln or other external sources. Alternately, a fuel like fuel oil, coke or coal etc. can be also burned partially in the vessel to generate heat. The gases (58) exiting from the adsorbent heater vessel (56) are sent for heat recovery and cleaning process. In the mixer vessel (44), surface to surface contact of the adsorbent and coke particles take place and the metal compounds are transferred from coke particle to the adsorbent particle and is trapped inside the adsorbent particle. The mobile vanadium transfers to the adsorbent particle when there is a surface to surface contact between the coke and adsorbent particles and gets adsorbed in the adsorbent particle by chemical adsorption. This is effected by certain reactive Lanthanum based compounds in the adsorbent which conjoins with vanadium to form a compound like Lanthanum Vanadate, after formation of which the metal is trapped inside the adsorbent particle and will lose its mobility to transfer back to the coke particles. The mixer vessel (44) is kept in fluidized condition by means of a fluid (45), which also can serve the purpose of converting the metal compounds in the coke particles to mobile metal compounds. For example, presence of steam at high temperature environment can make the metal vanadium mobile. Gases (47) exiting the mixer vessel (44) are sent for heat recovery and clean up. The adsorbent-coke mixture (46) from the mixer vessel (44) is then transported through a pneumatic transport riser (49) assisted by a transport fluid (48) and is sent to the separator vessel (50). In this case, both the coke particles and adsorbent particles are in the similar particle size range. The density of the coke particles is lesser compared to the adsorbent particles, for the same size. When the fluidizing gas is passed through the separator vessel (50), both coke and adsorbent particles get fluidized but the lower density coke particles relatively rise to the top section of the separator vessel and form the top layer. The higher density adsorbent particles sink to the bottom portion of the separator vessel and form the bottom layer. The adsorbent and coke particles separated due to the difference in fluidizing properties assisted by a fluidizing gas (51) and the coke (53) is withdrawn from the coke layer in the top section of the separator vessel (50) and is sent to the product silo (54). Gases (52) exiting the separator vessel is sent for heat recovery and clean up. The separated adsorbent particles (55) in the bottom section of the separator vessel are sent to the adsorbent heater vessel (56) for increasing the temperature of the adsorbent. A part of the metal laden adsorbent is withdrawn (59) from the adsorbent heater vessel and metal free fresh adsorbent (60) is loaded into the same. The rate of withdrawal and addition of adsorbent are determined based on the level of metal to be maintained in the adsorbent particles in steady state operation.

In one feature of the present invention, the system for conversion of fuel grade coke to anode grade coke implements the process of the present invention for conversion of fuel grade coke to anode grade coke.

The following non-limiting examples illustrate in detail about the invention. However, they are, not intended to be limiting the scope of present invention in any way.

Examples

High sulfur fuel grade petcokes from Delayed Coker units of Indian refineries were arranged and characterized for various properties. The analysis data for the coke samples of examples 1 and 2 are provided in Table-1.

TABLE 1

Properties of raw fuel grade coke

| Parameter | Example-1 | Example-2 |
|---|---|---|
| Particle size, max. mm | 60 | 0.002 |
| Sulfur, wt % | 6.17 | 5.95 |
| Volatile Matter Content, wt % | 8.94 | 10.5 |
| Ash content, wt % | 0.29 | 0.42 |
| Fixed carbon, wt % | 90.66 | 88.59 |
| Crystallinity, % | 7.8 | 6.7 |
| Vanadium, ppmw | 421 | 1200 |

The high sulfur fuel grade petcoke samples of examples 1 and 2 are subjected to thermal treatment in a laboratory calcination furnace. The calcined coke was cooled and mixed with a vanadium trap adsorbent micron sized particles containing 30 wt % of lanthanum oxide and 1 wt % of cerium oxide and alumina and clay. The said mixture of adsorbent and coke particles is heated and subjected to exposure of super-heated steam. After cooling, the adsorbent and coke particles were separated by fluidization and collected. The coke samples are analyzed for detailed properties. The experimental conditions are provided in Table-2.

TABLE 2

Experimental conditions

| Parameter | Example-1 | Example-2 |
|---|---|---|
| Calcination Temperature, deg C. | 1375 | 1350 |
| Calcination Heating rate, deg C./min | 12 | 15 |

TABLE 2-continued

Experimental conditions

| Parameter | Example-1 | Example-2 |
|---|---|---|
| Calcination Residence time, hrs | 4 | 4 |
| Adsorbent/Coke ratio, wt/wt | 5 | 9 |
| Mix temperature of Adsorbent & Coke, deg C. | 800 | 800 |
| Adsorbent-coke contact time, min | 25 | 40 |

The properties of treated coke sample are provided in Table-3.

TABLE 3

Properties of treated coke

| Parameter | Example-1 | Example-2 |
|---|---|---|
| Sulfur, wt % | 1.15 | 2.73 |
| Volatile Matter Content, wt % | 0.3 | 0.32 |
| Ash content, wt % | 0.41 | 0.50 |
| Fixed carbon, wt % | 99.1 | 99.0 |
| Real density, g/cc | 2.09 | 2.08 |
| Crystallinity, % | 31 | 29 |
| Vanadium, ppmw | 240 | 956 |

From the data provided in Table-3, it can be seen that the sulfur content of the thermally treated coke is considerably lesser compared to the initial fuel grade coke sample. The Crystallinity of the coke sample also increased significantly after thermal treatment. The coke sample after thermal treatment can be used for preparation of graphite electrode for use in aluminium industry.

Advantages of the Present Invention

The following are the technical advantages of the present invention over the prior art as disclosed above:
Uses high sulfur high metal fuel grade coke as the feedstock.
Uses a combination of thermal treatment in rotary kiln and adsorption to reduce the sulfur content of the coke from an initial level of 4-9 wt % to a lower level of 0.7-3 wt % and the undesirable metals especially vanadium, from an initial level of 250-1500 ppm to a lower level of 200-1450 ppm.
Enables the refiner to produce value added anode grade coke by converting high sulfur fuel grade coke.
In the prior arts, metal is removed from the feedstock prior to coking whereas in the present invention, metal removal from coke is achieved without any hydrocarbon feed pretreatment and associated hydrogen requirement.

The invention claimed is:
1. A process for conversion of a fuel grade coke to an anode grade coke, wherein the fuel grade coke comprises 3 to 9 wt % of sulfur, 7 to 13 wt % of a volatile matter, 85 to 91 wt % of a fixed carbon, 200 to 1500 ppm of vanadium, the process comprising:
(a) subjecting the fuel grade coke to thermal treatment in a rotary calciner kiln to produce a thermally treated coke, wherein the volatile matter ranges from 0 to 0.3 wt % and the sulfur ranges from 0.5 to 3 wt % in the thermally treated coke;

(b) mixing the thermally treated coke and a pre-processing adsorbent supplied from an adsorbent vessel in a mixing unit to effect transfer of metals from the thermally treated coke to the pre-processing adsorbent, thereby obtaining an adsorbent-coke mixture including demetallized coke and a metal laden adsorbent, wherein the demetallized coke is obtained by demetallizing the thermally treated coke and the metal laden adsorbent is obtained by increasing metal level in the pre-processing adsorbent;
(c) separating the demetallized coke and the metal laden adsorbent by fluidization;
(d) collecting the separated demetallized coke to obtain the anode grade coke;
(e) collecting the separated metal laden adsorbent and routing the separated metal laden adsorbent as post-processing adsorbent to the adsorbent vessel; and
(f) withdrawing a part of the post-processing adsorbent from the adsorbent vessel and adding a fresh metal free adsorbent to the adsorbent vessel to produce the pre-processing adsorbent supplied to the mixing unit in step (b), with a reduced metal level.

2. The process as claimed in claim 1, wherein the thermal treatment of the fuel grade coke in step (a) is performed at a temperature ranging from 1250 to 1500° C.

3. The process as claimed in claim 1, wherein the mixing of step (b) is carried out at a temperature in the range of 680 to 800° C. for a period ranging from 1 to 30 minutes.

4. The process as claimed in claim 1, wherein the mixing unit of step (b) is a rotary cooler.

5. The process as claimed in claim 4, wherein the ratio of an adsorbent flow rate to a fuel grade coke flow rate into the rotary cooler ranges from 1:1 to 15:1.

6. The process as claimed in claim 1, wherein:
the mixing unit includes a fluidized mixer vessel to mix the thermally treated coke and the pre-processing adsorbent; and
the thermally treated coke is crushed to fine powder of 10 to 500 micron size prior to mixing with the pre-processing adsorbent.

7. The process as claimed in claim 6, wherein the pre-processing adsorbent is heated to a temperature in the range of 680 to 800° C. prior to mixing with the thermally treated coke.

8. The process as claimed in claim 6, wherein the ratio of adsorbent flow rate to fuel grade coke flow rate into the fluidized mixer vessel ranges from 0.5:1 to 15:1.

9. The process as claimed in claim 1, wherein the adsorbent is a spherical particle of the size ranging from 10 to 160 microns and comprises:
1 to 40 wt % of a rare earth oxide;
5 to 25 wt % of an alumina;
1 to 9 wt % of a zeolite; and
10 to 45 wt % of a clay,
wherein the weight % being based on the total weight of the adsorbent and the rare earth oxide is selected from the group consisting of lanthanum oxide, cerium oxide and neodymium oxide.

10. A system for conversion of a fuel grade coke to an anode grade coke, the system comprising:

(a) a rotary kiln including:
a feed inlet for introducing into the rotary kiln a feed of the fuel grade coke, wherein the fuel grade coke is thermally treated within the rotary kiln;
(b) an adsorbent vessel that includes:
an inlet for introducing into the adsorbent vessel fresh metal free adsorbent; and
an inlet for introducing into the adsorbent vessel a post-processing adsorbent that is laden with metal, wherein the adsorbent vessel combines the fresh metal free adsorbent and the post-processing adsorbent to produce a pre-processing adsorbent,
(c) a mixing unit that is fluidly connected to the rotary kiln and to the adsorbent vessel and includes:
an inlet for introducing into the mixing unit the thermally treated coke received from the rotary kiln; and
an inlet for introducing into the mixing unit the pre-processing adsorbent from the adsorbent vessel,
wherein the mixing unit mixes the thermally treated coke and the pre-processing adsorbent to obtain an adsorbent-coke mixture including demetallized coke and metal laden adsorbent, and
(d) a separator vessel in fluid communication with the mixing unit and having an inlet for receiving the adsorbent-coke mixture from the mixing,
wherein the separator vessel separates the adsorbent-coke mixture into:
the demetallized coke for use as anode grade coke; and
the post-processing adsorbent to be introduced into the adsorbent vessel.

11. The system as claimed in claim 10, wherein the separator vessel includes a fluid inlet for a fluidizing medium that fluidizes and separates the demetallized coke and the post-processing adsorbent.

12. The system as claimed in claim 10, wherein the mixing unit includes a rotary cooler in fluid communication with the rotary kiln and the adsorbent vessel to cool and mix the thermally treated coke and the pre-processing adsorbent to obtain the adsorbent-coke mixture.

13. The system as claimed in claim 10, further comprising a cyclone separator is in fluid communication with the separator vessel to recover the fine particles in gases emerging out of the separator vessel for disposal or reuse.

14. The system as claimed in claim 10, wherein the mixing unit includes:
(i) a rotary cooler in fluid communication with the rotary kiln to receive and cool the thermally treated coke and to obtain a cooled thermally treated coke;
(ii) a crusher section in fluid communication with the rotary cooler to receive and crush the cooled thermally treated coke to obtain a crushed thermally treated coke; and
(iii) a mixer vessel in fluid communication with the crusher section and the adsorbent vessel to mix the crushed thermally treated coke and the pre-processing adsorbent to obtain the adsorbent-coke mixture.

15. The system as claimed in claim 14, wherein the fresh metal free adsorbent received is a heated adsorbent.

* * * * *